United States Patent Office
3,509,093
Patented Apr. 28, 1970

3,509,093
STABILIZED CHLORINE CONTAINING POLYMERS
Wolfgang Lehmann, Leverkusen, and Wilhelm Göbel, Cologne-Flittard, Germany, assignors to Farbenfabriken Bayer Aktiengesellschaft, Leverkusen, Germany, a corporation of Germany
No Drawing. Filed Aug. 28, 1967, Ser. No. 663,534
Int. Cl. C08c *13/10;* C08d *11/04;* C08f *45/60*
U.S. Cl. 260—45.85                     7 Claims

ABSTRACT OF THE DISCLOSURE

Light and heat stabilization of higher molecular weight chlorine containing polymers by the addition of a stabilizing amount of a compound of the formula:

ROCO—X—CONHNH$_2$ wherein R is alkyl, cycloalkyl, aryl, aralkyl, hydroxyalkyl or halogenoalkyl and X is an aliphatic, cycloaliphatic, aromatic or araliphatic group or one of the aforesaid groups containing a hetero atom.

---

This invention relates to a process for stabilising polymers containing chlorine.

Chlorine-containing compounds of relatively high molecular weight such as, for example, polymers of vinyl chloride and copolymers of vinyl chloride and vinyl acetate, polymers and copolymers of vinylidene chloride and chlorination products of higher or polymeric hydrocarbons such as, for example, chloroparaffin or chlorinated natural or synthetic rubber, undergo undesirable changes under the effect of light and heat, usually accompanied by the elimination of HCl. Such changes lead to deterioration of mechanical properties and discolouration. For this reason, stabilisers have to be added to chlorine-containing compounds of relatively high molecular weight in order to improve their processing and service properties.

Numerous compounds from a variety of classes have been proposed as stabilisers, for example inorganic compounds such as the oxides, hydroxides, carbonates, phosphates and phosphites of alkali and alkaline-earth metals and various heavy metals such as zinc, cadmium or lead, as well as other salts and also organic and organo-metallic compounds.

Where possible, one stabiliser should be suitable for many types of the aforementioned groups of polymers. It should stabilise the polymers both against heat and against light, it should in no way impede processing of the material and it should be compatible with additives, for example, plasticisers. Its physiological properties are also important. Many of the compounds which have already been proposed satisfy only some of these requirements.

Pure organic stabilisers often have the advantage over inorganic and organometallic compounds of being more effectively compatible with polymers and plasticisers and more resistant to the action of hydrogen sulphide and in addition, they impart better physiological and electrical properties to the end product.

On the other hand, their stabilising action, particularly against light, is not entirely satisfactory. In many cases, it is only developed in a prestabilised PVC emulsion, as demonstrated by the use, for example, of urea and thiourea derivatives, α-phenylindol, amino-crotonic acid esters and so on.

Monocarboxylic acid hydrazides and mono- and di-hydrazides of dicarboxylic acids have already been proposed for stabilising chlorine-containing polymers (German patent specifications Nos. 764,918 and 886,528). Whilst monocarboxylic acid hydrazides are unsatisfactory in their stabilising activity, against heat in particular, mono- and di-hydrazides of dicarboxylic acids are not sufficiently compatible with the polymers, in addition to which they are not thermally stable enough at the processing temperature, as shown by the formation of bubbles in the end products.

We have now found that chlorine-containing polymers can be stabilised really effectively by using dicarboxylic acid monoester monohydrazides as the stabilising agents. We have also found that the stabilising activity of the compounds used in accordance with the invention can be considerably improved in combination with phosphites, for example, triphenyl phosphite, or epoxides, for example, epoxidised vegetable oils, to such an extent that a sufficient long-term thermal stability may be imparted for example to hard PVC, a polymer usually prepared in suspension. In addition, the compounds according to the invention may readily be combined with commercial metal stabilisers based on elements from Group I, Group II–A and Group II–B of the Periodic System such as, for example, potassium, sodium, lithium, magnesium, calcium, barium, zinc, cadmium and so on, producing an outstanding synergistic effect as regards both the heat and the light stabilisation of chlorine-containing polymers.

The compounds used in accordance with the invention may be represented by the general formula:

ROCO—X—CONHNH$_2$ in which R represents an alkyl-, cycloalkyl-, aryl-, aralkyl-, hydroxyalkyl- or halogenoalkyl group and so on, whilst X represents an aliphatic, cycloaliphatic, aromatic or araliphatic group which may also contain hetero atoms. Some of them are known from the literature and may readily be prepared, for example, by reacting dicarboxylic acid diesters with hydrazine or hydrazine hydrate.

Of the large number of compounds which may be used in accordance with the invention, the following are mentioned by way of example without limiting the scope of the invention in any way:

Adipic acid monomethylester monohydrazide, sebacic acid monomethylester monohydrazide, terephthalic acid monomethylester monohydrazide, terephthalic acid monooxyethyl ester monohydrazide, terephthalic acid monoethylester monohydrazide, terephthalic acid monobutylester monohydrazide, terephthalic acid mono-isooctylester monohydrazide, terephthalic acid monocyclohexylester monohydrazide, terephthalic acid monobenzylester monohydrazide, terephthalic acid monophenylester monohydrazide, isophthalic acid monomethylester monohydrazide, naphthalene-1,5-dicarboxylic acid monoethylester monohydrazide, diphenyl-1,4-dicarboxylic acid monomethylester monohydrazide, 2,2-bis-(p-carboxyphenyl)-propanemonomethylester monohydrazide, 1,4-phenylenedioxyacetic acid-monomethylester-monohydrazide, 1,4-phenylene-dipropionic acid monomethyl ester monohydrazide, thiodiacetic acid monoethylester monohydrazide and C$_{10}$H$_{21}$OCOS—CH$_2$—S—CH$_2$—CONHNH$_2$.

The stabilisers used in accordance with the invention are crystallised or oily, odourless compounds which are highly compatible with the chlorine-containing polymers and copolymers and the normally used plasticisers and elasticising agents, producing excellent heat and light stabilisation. Their melting points coincide with the temperatures at which the polymers are processed although their decomposition points are very much higher, so that they guarantee smooth, bubble-free processing, clear end products being obtained providing the material to be stabilised is suitably chosen. In addition, they are not toxic.

They are normally used by adding them to the polymers either individually or in admixture with one another or with other stabilisers in quantities of from 0.1% to 5.0%, preferably from 0.5% to 2.0%. They may be added to the polymers or copolymers, for example, during polymerisation or during subsequent preparation of the mixture, for example, on mixing rolls.

The colour of the samples is represented by the following numbers in the following tables:

Colourless _____ 1
Yellowish _____ 2
Brownish _____ 3
Yellow, orange _____ 4
Brown, red-brown _____ 5
Dark brown, black _____ 6

TABLE 1

| Sample | Colour after 10 minutes' rolling | Colour of the 10-minute rough sheet in a heating cabinet at 170° C. after— | | | | Colour of the 10-minute rough sheet after exposure for— | |
|---|---|---|---|---|---|---|---|
| | | 15 minutes | 30 minutes | 45 minutes | 60 minutes | 24 hours | 100 hours |
| a | 1 | 2 | 2 | 2 | 2 | | 1 |
| b | 1-2 | 2 | 2 | 2 | 2 | | 1-2 |
| c | 1-2 | 2 | 2 | 2 | 3 | | 1-2 |
| d | 1 | 2 | 5 | 6 | | 1 | 1 |
| e | 1 | 1 | 4 | 5 | 6 | 1 | 1 |
| f | 2 | 2 | 4 | 4 | 4 | 5 | |
| g | 2 | 4 | 4 | 5 | 6 | 2 | 2 |
| h | 2 | 2 | 5 | 6 | | 1 | 1 |
| i | 5 | | | | | | |

Compounds of relatively high molecular weight which are suitable for the process according to the invention include, for example, polymers of vinyl chloride or vinylidene chloride, 2-chlorobutadiene or copolymers of these compounds with vinyl acetate, chlorinated rubber and sulphonated polyethylene.

The compounds used in accordance with the invention satisfy the requirements made of a pure organic stabiliser for chlorine-containing polymers of relatively high molecular weight much more effectively than conventional compounds. In comparison with, for example, urea and thiourea derivatives, indole derivatives, monocarboxylic acid hydrazides, and salts and esters of phosphoric acid and phosphorus acid, they provide excellent stabilisation against both heat and light, both in PVC emulsion and in PVC suspensions. This high level of stabilisation can be increased even further by suitable combinations with phosphites and mono-, di- and polyepoxide compounds. They are high compatible with the chlorine-containing polymers and copolymers and the plasticisers and elasticising agents normally used, and are not toxic. The outstanding properties of the substances are compared in the following examples with those conventional stabilisers on a purely organic basis.

EXAMPLE 1

Batches of 100 parts by weight of a PVC prepared by emulsion polymerisation (K-value 70) are mixed with one of the substances listed below on a roller heated to 160° C. Samples of the sheets obtained after 10 minutes' rolling are stored in a through-circulation heating cabinet at a temperature of 170° C. and then exposed to the light of a high-pressure zenon lamp (Xeno-Test instrument, Original Hanau) for 24 and 100 hours. Table 1 shows the discolouration absorbed after the time indicated.

The following compounds are added as stabilisers:

(a) 1 part by weight of terephthalic acid monomethylester monohydrazide;
(b) 1 part by weight of terephthalic acid mono-oxyethylester monohydrazide;
(c) 1 part by weight of terephthalic acid monobutylester monohydrazide;

The following compounds are used for comparison:

(d) 1 part by weight of phenylurea;
(e) 1 part by weight of diphenyl thiourea;
(f) 1 part by weight of α-phenyl indole;
(g) 1 part by weight of aminocrotonic acid ester;
(h) 1 part by weight of 4-chlorobenzhydrazide
(i) no additive

EXAMPLE 2

Batches of 100 parts by weight of PVC prepared by suspension polymerisation (K-value 70) are rolled at 165° C. with 2 parts by weight of one of the following substances and samples of the sheets thus obtained are tested as described in Example 1. The results are set out in Table 2.

The following compounds are added as stabilisers:

(a) terephthalic acid monomethylester monohydrazide;
(b) terephthalic acid mono-oxyethylester monohydrazide;

The following substances were used for comparison:

(c) phenylurea;
(d) diphenylthiourea;
(e) α-phenylindole;
(f) 4-chlorobenzhydrazide;
(g) no additive.

TABLE 2

| Sample | Colour after 10 minutes rolling | Colour of the 10-minute rough sheet in a heating cabinet at 170 ° C. after— | | |
|---|---|---|---|---|
| | | 15 minutes | 30 minutes | 45 minutes |
| a | 1 | 3 | 5 | 6 |
| b | 1 | 3 | 5 | 6 |
| c | 5 | | | |
| d | 5 | | | |
| e | 2 | 5 | 6 | |
| f | 1 | 5 | 6 | |
| g [1] | 5 | Adheres strongly to the roller | | |

[1] After 5 minutes.

EXAMPLE 3

Batches of 100 parts by weight of a PVC prepared by suspension polymerisation (K-value 70) are rolled at 165° C. with 3 parts by weight of an epoxidised vegetable oil and 1 part by weight of one of the following substances, and samples of the sheets thus obtained are tested as described in Example 1. The results are set out in Table 3.

The following compounds are added as stabilisers:

(a) terephthalic acid monomethylester monohydrazide;
(b) terephthalic acid mono-oxyethylester monohydrazide;
(c) terephthalic acid monobutylester monohydrazide;

The following substances were used for comparison:

(d) diphenylthiourea;
(e) α-phenylindole;
(f) 4-chlorobenzhydrazide.

TABLE 3

| Sample | Colour after 10 minutes' rolling | Colour of the 10-minute rough sheet in a heating cabinet at 170° C. after— | | | | Colour of the 10-minute rough sheet after exposure for— | |
|---|---|---|---|---|---|---|---|
| | | 15 minutes | 30 minutes | 45 minutes | 60 minutes | 24 hours | 100 hours |
| a | 1 | 2 | 3 | 5 | 6 | | 1 |
| b | 1 | 1 | 2 | 4 | 5 | | 1 |
| c | 1 | 1 | 2 | 3 | 5 | | 1 |
| d | 3 | 5 | 6 | | | | |
| e | 1 | 3 | 3 | 5 | 5 | 5 | 5 |
| f | 1 | 3 | 5 | 6 | | | 1 |

EXAMPLE 4

60 parts by weight of a PVC prepared by emulsion polymerisation (K-value 70) and 40 parts by weight of dioctyl phthalate are rolled with 1 part by weight of each of the following substances (based on PVC) at 160° C., and samples of the resulting sheets are tested as described in Example 1. The results are set out in Table 4.

The following compounds are added as stabilisers:

(a) terephthalic acid mono-oxyethylester monohydrazide;
(b) terephthalic acid monobutylester monohydrazide;
(c) no additive.

TABLE 4

| Sample | Colour after 10 minutes' rolling | Colour of the 10-minute rough sheet in a heating cabinet at 170° C. after— | | | |
|---|---|---|---|---|---|
| | | 15 minutes | 30 minutes | 45 minutes | 60 minutes |
| a | 2 | 2 | 2 | 2 | 2 |
| b | 2 | 2 | 2 | 2 | 2 |
| c | 3 | 3 | 3 | 5 | 5 |

EXAMPLE 5

60 parts by weight of a PVC prepared by suspension polymerisation (K-value 70), 37 parts by weight of diphenyl cresyl phosphate and 3 parts by weight of an epoxidised vegetable oil are rolled at 160° C. with 1 part by weight (based on PVC) of each of the following substances and samples of the resulting sheets are tested as described in Example 1. The results are set out in Table 5.

The following compound is added as stabiliser:

(a) terephthalic acid mono-oxyethylester monohydrazide.

The following compound is used for comparison:

(b) 4-chlorobenzhydrazide.

TABLE 5

| Sample | Colour after 10 minutes' rolling | Colour of the 10-minute rough sheet in a heating cabinet at 170° C. after— | | | | | Colour of the 10-minute rough sheet after exposure for— | |
|---|---|---|---|---|---|---|---|---|
| | | 15 minutes | 30 minutes | 45 minutes | 60 minutes | 90 minutes | 24 hours | 100 hours |
| a | 1 | 1 | 1 | 1 | 2 | 4 | | 1 |
| b | 1 | 2 | 2 | 2 | 4 | 6 | | 1 |

EXAMPLE 6

60 parts by weight of a PVC prepared by suspension polymerisation (K-value 70), 37 parts by weight of an alkyl sulphonic acid ester of phenol/cresol and 3 parts by weight of an epoxidised vegetable oil are rolled at 160° C. with 1 part by weight (based on PVC) of each of the following substances, and samples of the resulting sheets are tested as described in Example 1. The results are set out in Table 6:

The following compound is added as a stabiliser:

(a) terephthalic acid monobutylester monohydrazide.

The following compound is used for comparison:

(b) 4-chlorobenzhydrazide.

TABLE 6

| Sample | Colour after 10 minutes' rolling | Colour of the 10-minute rough sheet in a heating cabinet at 170° C. after— | | | | | Colour of the 10-minute rough sheet after exposure for— | |
|---|---|---|---|---|---|---|---|---|
| | | 15 minutes | 30 minutes | 45 minutes | 60 minutes | 90 minutes | 24 hours | 100 hours |
| a | 1 | 1 | 1 | 1 | 2 | 2 | | 1 |
| b | 1 | 1 | 2 | 2 | 4 | 5 | | 2 |

EXAMPLE 7

Batches of 60 parts by weight of a PVC prepared by emulsion polymerisation (K-value 70) are rolled into sheets on mixing rolls heated to 160° C. with 40 parts by weight of an alkylsulphonic acid ester of phenol/cresol and 1 part by weight of one of the stabilisers listed below (based on PVC). The resulting sheets were granulated and the granulates processed to form hoses by means of an extruder.

Whereas 4-chlorobenzhydrazide as a stabiliser produced a white coating on the hoses after a period of 6 weeks, hoses incorporating terephthalic acid monobutylester monohydrazide, did not show any signs of exuding even after 12 weeks storage.

EXAMPLE 8

100 parts by weight of a vinyl chloride/vinyl acetate copolymer containing 13% of vinyl acetate (K-value 50) are rolled for 10 minutes on heating rolls heated to 140° C. with 1 part by weight of isophthalic acid mono-octylester monohydrazide and 3 parts by weight of an epoxidised vegetable oil, and samples of the sheets thus obtained are tested as described in Example 1.

In comparison with a nonstabilised sample, which turned in colour after only 10 minutes' rolling, the stabilised sample had turned yellow in colour after 45 minutes' storage in a heating cabinet.

EXAMPLE 9

100 parts by weight of a suspension PVC (K-value 70) are rolled for 10 minutes on mixing rolls heated to 170° C. with the substances and mixtures of substances listed in Table 9, and samples of the sheets thus obtained are stored at 170° C. in a through-circulation heating cabinet and then exposed to the light of a high-pressure xenon lamp.

Table 9 shows the discolouration noted after the periods indicated.

In Table 9, substance A is a terephthalic acid monobutylester monohydrazide
substance B a mixture of 30% by weight of Liphenolate, 40% by weight of isononylphenol, and 30% by weight of palmitic acid
substance C a mixture of 30% by weight of Mg phenolate, 30% by weight of isononylphenol, and 40% by weight of palmitic acid
substance D a mixture of 20% by weight of Caphenolate, 30% by weight of isonoylphenol, and 50% by weight of palmitic, stearic and oleic acids
substance E a mixture of 17% by weight of Baphenolate, 50% by weight of isonoylphenol, and 33% by weight of oleic acid
substance F a mixture of 35% by weight of Cd phenolate, 45% by weight of isononylphenol, 20% by weight of triphenylphosphite.
substance G a mixture of 20% by weight of Zn phenolate, 30% by weight of isononylphenolate, 40% by weight of palmitic, stearic, and oleic acids, and 10% by weight of triphenylphosphite
substance H a mixture of barium/cadmium laurate
substance I a mixture of dinonyl-phenylphosphite
substance K epoxidised soya oil.

Examples 9a–n clearly show the outstanding synergistic influence of the compounds according to the invention with commercial metal stabilisers (substances B–H) on the stability to heat and light of PVC, even in combination with additional epoxidised soya oil and phosphite stabilisers.

What we claim is:

1. A mixture comprising a heat and light sensitive high molecular weight, polymer derived from a chlorine-containing ethylenically unsaturated monomer and a stabilizing amount of a compound of the formula

ROCO—X—CONHNH$_2$ wherein R is alkyl, cycloalkyl, aryl, aralkyl, hydroxyalkyl or halogenoalkyl, and X is an aliphatic, cycloaliphatic, aromatic or araliphatic group or one of the aforesaid groups containing a hetero atom.

2. The mixture of claim 1 wherein said polymer is a homopolymer of vinyl chloride, vinylidene chloride or 2-chlorobutadiene or a copolymer thereof with vinyl acetate or chlorinated rubber.

3. The mixture of claim 1 wherein X is an aromatic group.

4. The mixture of claim 3 wherein R is alkyl.
5. The mixture of claim 3 wherein R is hydroxyalkyl.
6. The mixture of claim 3 wherein R is methyl.
7. The mixture of claim 3 wherein R is butyl.

TABLE 9

| | Stabiliser, parts by weight | Substance | Rough sheet discolouration after 10 mins. | Discolouration after storage in a heating cabinet at 170° C. after minutes— | | | | | | Xenot-Test [1] |
|---|---|---|---|---|---|---|---|---|---|---|
| | | | | 15 | 30 | 45 | 60 | 75 | 90 | |
| Example 9: | | | | | | | | | | |
| (a) | 2 | A | 1 | 3 | 5 | 5 | 6 | | | |
| (b) (1) | 2 | B | 3 | 5 | 5 | 5.6 | 6 | | | 1 |
| (2) | 1 | A | 1 | 1 | 1–2 | 1–2 | 2 | 3 | 6 | |
| | 1 | B | | | | | | | | |
| (c) (1) | 2 | C | 3 | 5 | 5 | 5 | 5 | 6 | | 1 |
| (2) | 1 | A | 1 | 1 | 2 | 2 | 5 | 6 | | |
| | 1 | C | | | | | | | | |
| (d) (1) | 2 | D | 3 | 5 | 5–6 | 6 | | | | 1 |
| (2) | 1 | A | 1 | 1 | 1 | 1–2 | 6 | | | 1 |
| | 1 | D | | | | | | | | |
| (e) (1) | 2 | E | 3 | 5 | 6 | | | | | 1 |
| (2) | 1 | A | 1 | 1 | 2 | 5 | 6 | | | |
| | 1 | E | | | | | | | | |
| (f) (1) | 2 | F | 1 | 6 | | | | | | 1 |
| (2) | 1 | A | 1 | 1 | 1–2 | 5 | 6 | | | |
| | 1 | F | | | | | | | | |
| (g) (1) | 2 | G | 1 | 6 | | | | | | 1 |
| (2) | 1 | A | 1 | 1–2 | 1–2 | 6 | | | | |
| | 1 | G | | | | | | | | |
| (h) (1) | 1 | A | 1 | 1 | 1–2 | 2 | 2 | 2 | 6 | 1 |
| | 1 | B | | | | | | | | |
| | 1 | G | | | | | | | | |
| (i) | 1 | A | 1 | 1 | 1 | 1–2 | 2 | 3 | 6 | 1 |
| | 1 | D | | | | | | | | |
| | 1 | H | | | | | | | | |
| (k) | 1 | A | 1 | 1 | 1–2 | 1–2 | 6 | | | 1 |
| | 1 | D | | | | | | | | |
| | 1 | G | | | | | | | | |
| (l) | 1 | A | 1 | 1–2 | 2 | 2 | 2 | 2 | 2 | |
| | 1 | B | | | | | | | | |
| | 1 | G | | | | | | | | |
| | 1 | K | | | | | | | | |
| (m) | 1 | A | 1 | 1 | 1–2 | 1–2 | 2 | 2 | 3 | |
| | 1 | B | | | | | | | | |
| | 1 | G | | | | | | | | |
| | 1 | I | | | | | | | | |
| (n) (1) | 2 | H | 3 | 3 | 3 | 3 | 3 | 3 | 3 | |
| (2) | 1,5 | H | 1 | 1 | 1–2 | 1–2 | 2 | 2 | 2 | |
| | 1,0 | A | | | | | | | | |

[1] Discolouration after 500 hours.

References Cited

UNITED STATES PATENTS

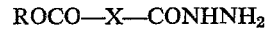

| 1,249,584 | 5/1966 | Gasparis | 260—45.85 |
| 3,357,944 | 12/1967 | Dexter | 260—45.9 |
| 3,412,139 | 11/1968 | Eggensperger | 250—45.85 |

DONALD E. CZAJA, Primary Examiner

V. P. HOKE, Assistant Examiner

U.S. Cl. X.R.

260—45.8, 45.9